United States Patent [19]

Vonasek

[11] Patent Number: 4,794,407

[45] Date of Patent: Dec. 27, 1988

[54] RECORDING DEVICE HAVING ROTATABLE MATRIX UNIT AND SENSOR MEANS FOR DETECTING RELATIVE MOVEMENT DIRECTION, RELATIVE SPEED AND ROTATION ANGLE OF MATRIX COLUMN

[75] Inventor: Jiri Vonasek, Kungälv, Sweden

[73] Assignee: Markpoint System AB, Gothenberg, Sweden

[21] Appl. No.: 119,509

[22] Filed: Nov. 12, 1987

[30] Foreign Application Priority Data

Nov. 12, 1986 [SE] Sweden .............................. 8604836

[51] Int. Cl.[4] ........................................ G01D 15/16

[52] U.S. Cl. .......................... 346/139 R; 346/140 R; 400/126; 400/124

[58] Field of Search .................... 346/140 PD, 139 R; 400/126, 121, 124, 139, 148; 101/93.17, 93.18

[56] References Cited

U.S. PATENT DOCUMENTS 4,408,907 10/1983 Bernadis .............................. 400/124

FOREIGN PATENT DOCUMENTS 0031421 7/1981 European Pat. Off. ..... 400/140 PD 3208104 9/1983 Fed. Rep. of Germany ...... 400/126

*Primary Examiner*—E. A. Goldberg

*Assistant Examiner*—Huan H. Tran

*Attorney, Agent, or Firm*—Holman & Stern

[57] ABSTRACT

A device for recording of information in the form of characters or symbols onto an information carrier. A recording device of the matrix type (13) is rotatable around an axis perpendicular to a column of the matrix.

The recording device is arranged for relative movement relative the actual information carrier and means are arranged for actuating the matrix for information recording in the movement direction dependent on the angle between a matrix column and the movement direction.

A sensor arrangement is rotatable together with the matrix column and has means for detecting of at least the parameters relative movement direction, relative speed and said angle.

A single processing unit is arranged for controlling the character recording in said predetermined manner dependent on said parameters.

7 Claims, 2 Drawing Sheets

Figure 1:
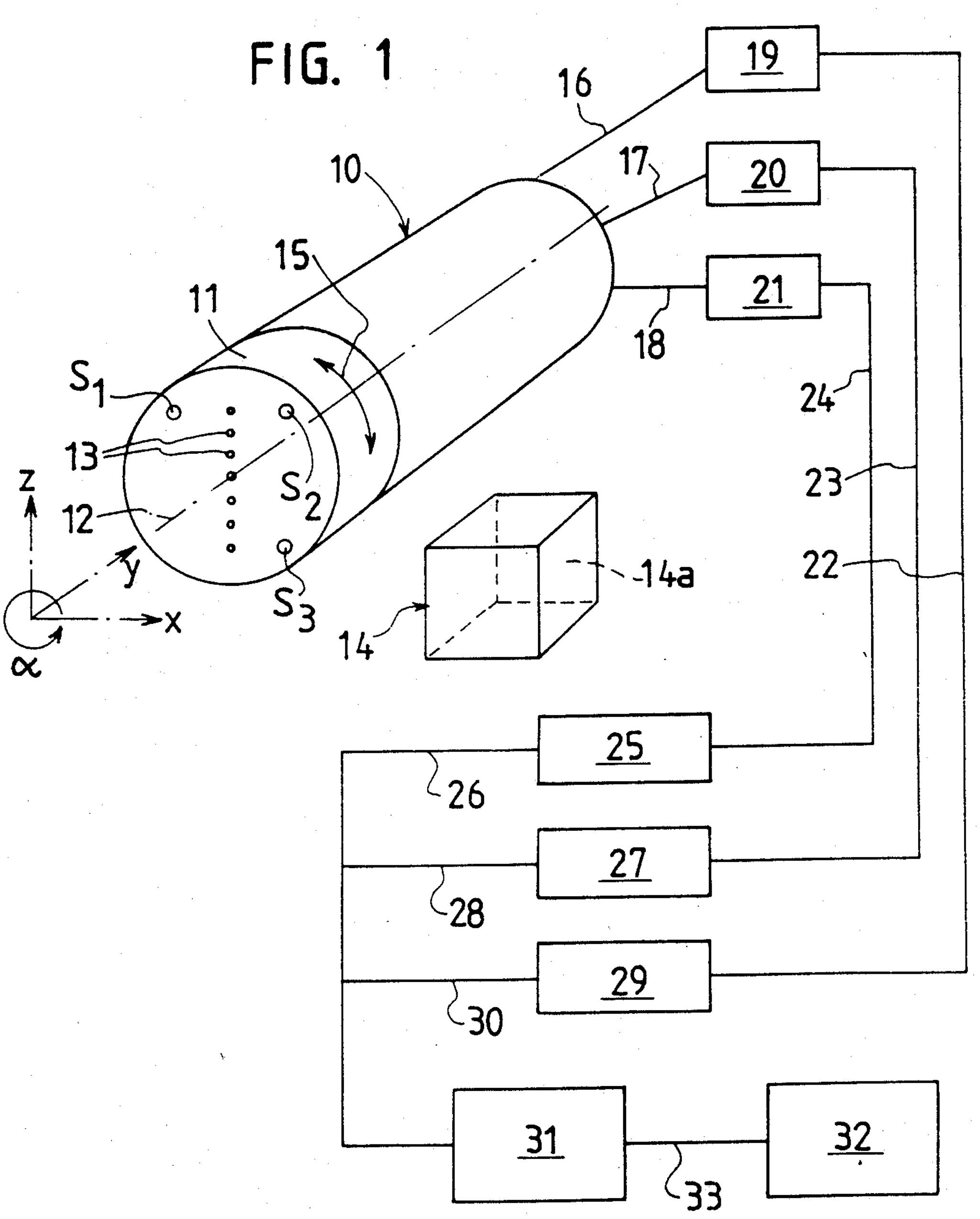

RECORDING DEVICE HAVING ROTATABLE MATRIX UNIT AND SENSOR MEANS FOR DETECTING RELATIVE MOVEMENT DIRECTION, RELATIVE SPEED AND ROTATION ANGLE OF MATRIX COLUMN

The present invention relates to a device for recording of information in the shape of characters or symbols onto an information carrier. More precisely, the recording or generation of characters is obtained by a printer or recording device of the matrix type, for instance of the ink jet printer type.

The problem of the present invention is to make such printers useful in applications where the user wants a character recording in a predetermined manner but simultaneously wants to have freedom degrees in the movement of the information carrier and the recording device.

It may for instance be necessary to use one and the same matrix printer for a plurality of different transport directions of the objects, for instance post parcels, which are to be printed onto by the printer. Additionally, dependent on the size of said objects it may be necessary to change the character size, i.e. the height and the width, and it may also be necessary to change the dot size of the dots printed by the matrix printer. Furthermore, it may be necessary to provide different slopes of the characters by means of the matrix.

Thus, it is desirable to design a recording system which automatically gives a recording of characters in a predetermined manner independent of any changes in the aforesaid basic requirements.

In my unpublished Swedish patent application No. 8603122-6, now abandoned, there is disclosed a method of controlling the character size with due consideration of the flexibility and comfort demands a user may set up.

In the European patent application having the publication No. 0 031 421 there is described how the change of a 90° angle between a matrix column and a fixed recording direction provides a change of size of the characters and places such characters in the desired shape onto a recording medium or recording carrier.

The object of the present invention is to provide a printer arrangement, starting out from the state of the art in said European patent application and my aforesaid abandoned Swedish patent application, which meets the user flexibility demands without any need for the user to waste time and efforts in repeated adjustment and resetting of the printer.

The present invention provides a device for recording of information in the shape of characters or symbols onto an information medium or information carrier, comprising a recording device of the matrix type, means for providing a relative movement between said recording device and information carrier, means for supporting a recording device rotatably around a shaft generally perpendicular to the relative movement direction of the recording device and the information carrier, and means for activating said matrix for information recording in the direction of movement in relation to the angle between a matrix column and the direction of movement.

The device is characterized in that the recording device comprises a sensor arrangement rotatable around said shaft and provided with means for detecting at least one of the parameters of relative direction of movement, relative speed and said angle, and by a single processing unit arranged for controlling the recording of characters in a predetermined manner dependent on said parameters.

In a preferred embodiment the sensor arrangement comprises at least three separate detectors, at least two of which are separated at a predetermined distance in the relative direction of movement and a third one being arranged at a predetermined distance from an imaginary line through said two other detectors.

Preferably, the detector and the matrix form a rotatable subunit of the recording device.

According to one version of the invention, the signal processing device comprises a unit for determining the width of a character in the direction of movement.

Preferably, the signal processing device also comprises a unit for determining the dot size of the matrix dependent on said angle.

In one practical embodiment the arrangement is such that the signal processing device comprises a unit for providing a rotation compensation output signal to a control unit of the matrix, dependent on a first signal reprentative of the character distance, a second signal representative of the dot size and a third signal representative of the relative direction of movement, said signal then initiating a program for character recording in said predetermined manner.

Preferably the recording device comprises an ink jet matrix printer.

Figure 3:
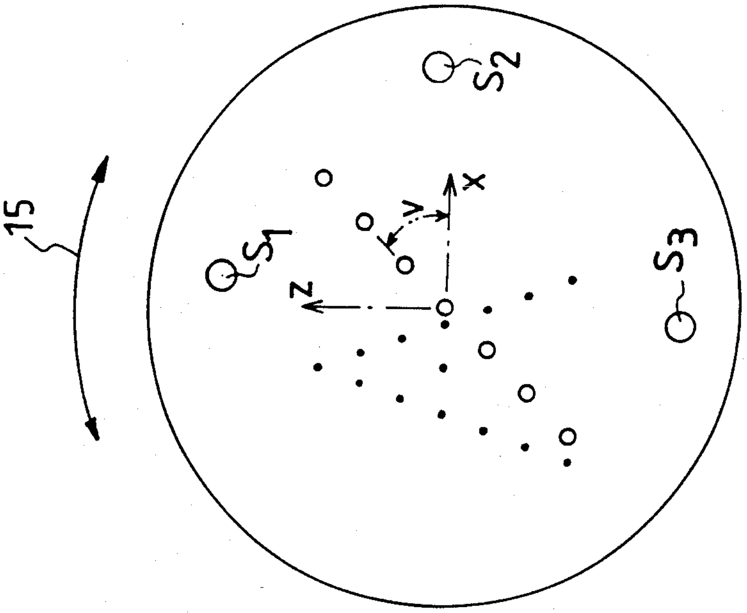
Figure 2:
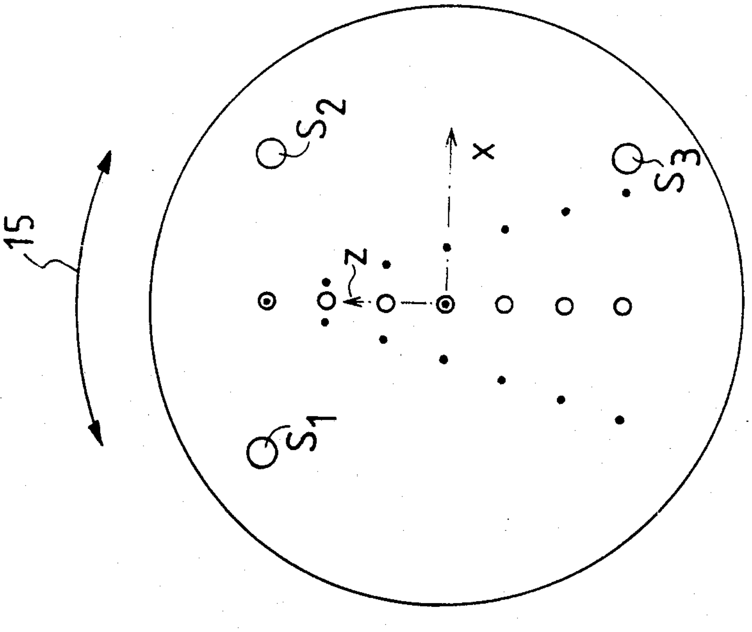

One embodiment of the invention will now be described by reference to the accompanying drawings, where:

FIG. 1 is a schematic block diagram, which shows the matrix printer according to the present invention, FIG. 2 is a front view of a printer in a first angle position, and FIG. 3 is a front view of the printer in a second angle position.

By the reference numeral 10 in FIG. 1 there is shown a matrix printer having a generally cylindrical front part 11 arranged for rotation around a center axis 12. In the figure this center axis coincides with the y-axis of a cartesian coordinate system. The rotatable housing part 11 supports the printer matrix, which in this particular embodiment is shown as a single column ink jet printer comprising seven matrix dots or ink output openings 13. In the figure the rotation plane of said openings 13 falls in a plane generally parallel to the xz-plane of the shown coordinate system.

In the actual embodiment three photodetectors $S_1$, $S_2$, $S_3$ are arranged in the rotation plane of the openings 13 and rotate together with the matrix openings 13. The detectors are arranged such that two, $S_1$ and $S_2$, define a certain distance in the direction of the x-axis when the orientation is the one indicated in FIG. 1, and such that one, $S_3$, is placed at a certain distance from an imaginary line through $S_1$ and $S_2$.

An information carrier 14, in the present case a box, has the backside 14*a* thereof in a plane parallel to the xz-plane and is transported in said plane past the openings 13. The angle between the transport direction and the matrix column, basically, may be an angle between 0° and 360°.

In order to be able to obtain the necessary character recording in such a case, the printer matrix is rotatable. The part 11, which houses the matrix, is rotatable in the direction of the double arrow 15 for giving an operative angle between the matrix column 13 and the direction of movement (the recording direction) that provides the correct size of the characters.

In FIGS. 2 and 3 there is shown the change in size which is obtained in a known manner by rotation of the matrix column a positive angle 90°-v relative the z-axis.

Although the embodiment in the figure does tell that the printer should be fixed and the information carrier movable, it is of course possible to have the reverse situation, meaning that the parameters considered in the present context are relative ones, i.e. relative speed, relative angle of rotation, etc.

By the given placement of the detectors it will be possible to obtain signals representative of direction (i.e. relative direction), speed and angle (generally measured as the angle v in FIG. 3). Output signals representing the actual $S_1$-, $S_2$- and $S_3$- states are obtained at outputs 16, 17 and 18 from the recording device 10. Said signals are processed in the units 19, 20 and 22 for providing output signals representative of direction, speed and angle at the outputs 22, 23, 24.

A further signal processing unit 25 operates dependent on the actual signal representing the rotation angle for giving a signal at the output 26 representative of the dot size that is selected. A second further signal processing unit 27 determines the angle and the speed signal on the leads 23 and 24, and provides a signal at the output 28 representative of the character width, which has been selected.

From the lead 22 the signal processing unit 29 obtains a direction signal, which at the output 30 will be a dot sequence signal.

The signals from the leads 26, 28 and 30 are supplied to a final processing unit, which provides the actual signal representative of the rotation compensation via the lead 33 to a matrix printer 32.

The unit 31 is preprogrammed and starting out from momentaneous parameter values the matrix openings are controlled as to time sequence and matrix dot size in order to automatically provide the preset and preprogrammed character configuration. The one and only contribution of the user resides in adjusting the rotation angle of the part 14 in any desired manner.

Although a specific embodiment has been described, it is realized that modifications and alternatives are possible within the scope of the claims.

I claim:

1. In a device for recording information in the form of characters or symbols onto an information carrier (14), the device including a recording device of the matrix type, means for providing a relative movement between the recording device and the information carrier, means for supporting the recording device rotatably around an axis (12) generally perpendicular to the direction of relative movement between the recording device and the information carrier, and means for activating the matrix for information recording in the movement direction dependent on the angle between a matrix column of the recording device and the movement direction, the improvement comprising a sensor arrangement rotatable with the recording device around said axis and having means for detecting the parameters of relative movement direction, relative speed and said angle, and a signal processing unit for controlling the character recording in a predetermined manner dependent on said detected parameters.

2. A device as in claim 1, wherein the sensor arrangement comprises at least three separate detectors, at least two of which said detectors are separated from each other at a predetermined distance in the relative movement direction and a third one of which said detectors is located at a certain distance from an imaginary line through the two other said detectors.

3. A device as in claim 2, wherein the detectors and the matrix form a rotatable subunit of the recording device.

4. A device as in claim 3, wherein the signal processing unit comprises a means for determining the width of the characters in the movement direction dependent on said angle and said relative speed.

5. A device as in claim 4, wherein the signal processing unit comprises a means (25) for determining the dot size of the matrix dependent on said angle.

6. A device as in claim 5, wherein the signal processing unit comprises a means (31) for providing a rotation compensation output signal to a control unit of the matrix column dependent on a first signal representative of the character distance, a second signal representative of the dot size and a third signal representative of the relative movement direction, said rotation compensation output signal initiating a program in said control unit for providing character recording in said predetermined manner.

7. A device as in claim 6, wherein the recording device comprises an ink jet matrix printer.

* * * * *